United States Patent [19]
Meare

[11] Patent Number: 5,506,960
[45] Date of Patent: Apr. 9, 1996

[54] DATA PROCESSING SYSTEM

[75] Inventor: David P. Meare, Oldham, Great Britain

[73] Assignee: International Computers Limited, London, Great Britain

[21] Appl. No.: 528,642

[22] Filed: Sep. 14, 1995

Related U.S. Application Data

[63] Continuation of Ser. No. 154,356, Nov. 18, 1993, abandoned.

[30]    Foreign Application Priority Data

Jan. 22, 1993 [GB] United Kingdom .................... 9301286

[51] Int. Cl.$^6$ ...................................................... G06F 11/00
[52] U.S. Cl. ..................... 395/183.21; 364/269.4
[58] Field of Search ...................... 395/183.21; 364/269.4

[56]                 References Cited

FOREIGN PATENT DOCUMENTS 0366583   5/1990   European Pat. Off. .

OTHER PUBLICATIONS

*Operating System Concepts*, Fourth Edition by Abraham Silberschatz et al. ©1994 by Addison–Wesley Publishing Co. Inc. pp. 349–354.
*Modern Operating Systems* by Andrew S. Tanenbaum ©1992 by Prentice–Hill Inc. pp. 145, 146.

Lister, "Fundamentals of Operating Systems", Macmillan Press, 1979, pp. 102–106.
Marinescu, "Inter–process Communication in MUS/XA (etc.)", Software Practice and Experience, vol. 16, No. 5, May 1986, pp. 489–501.
Hatakeyama, "Numerical Information Environment and its application (ets.)" Proceeding of 11th Annual International Software and Applications Conference, 7 Oct. 1987, pp. 65–74.

*Primary Examiner*—Vincent P. Canney
*Attorney, Agent, or Firm*—Lee, Mann, Smith, McWilliams, Sweeney & Ohlson

[57]                 ABSTRACT

A data processing system includes a control computer which controls and monitors a cooling subsystem. The control computer has a non-volatile memory holding two status logs for recording stautus data and fault information. One of the logs is selected as the current log. If a fault condition is detected, the control computer writes fault information into the current log and then, if the other log is unlocked, locks the current log and selects the other log as the current log. In response to a "request locked log" command, the control computer transmits the contents of the locked log. In response to an "unlock" command, the control computer unlocks the locked log and then, if the other log contains fault information, locks that other log. The system thus provides an efficient mechanism for ensuring that the fault information is maintained, even through system power-down.

7 Claims, 6 Drawing Sheets

DATA PROCESSING SYSTEM

This application is a continuation of application Ser. No. 08/154,356, filed Nov. 18, 1993, now abandoned.

BACKGROUND OF THE INVENTION

Some computer systems have intelligent subsystems controlling and error managing their power distribution and cooling functions. These functions need to be resilient to a wide variety of failure modes in order to approach the non-stop running aspirations of their users. It is therefore necessary for the intelligence within them to be able to report the occurrence of failures which reduce such resilience.

It is advantageous for such reporting to be done via the supported systems, as they tend to have superior communications and man-machine interfaces. The problem associated with such reporting routes is that they are dependent on transient applications in the supported system, which are subject to being suspended and even deleted and restarted.

It is therefore desirable to provide a method of recording fault information within the subsystem, and ensuring that the information is maintained, even through a system power-down, and then subsequently passed to the supported system and the people and/or systems responsible for its maintenance.

The object of the present invention is to provide a mechanism for achieving this.

SUMMARY OF THE INVENTION

According to the invention there is provided a data processing system comprising first and second processing units, wherein the first processing unit includes:

(a) a non-volatile memory holding a plurality of status logs, (b) means for designating one of said logs as the current log, (c) means for designating each of said logs as locked or unlocked, (d) means for writing fault information into the current log and then, if at least one other log is unlocked, locking the current log and designating said other log as the current log, (e) means for transmitting the contents of the locked log to the second processing unit in response to a data request from the second processing unit, and (f) means for unlocking the locked log in response to an unlocking request from the second processing unit.

DESCRIPTION OF AN EMBODIMENT OF THE INVENTION

One embodiment of the invention will now be described by way of example with reference to the accompanying drawings.

Overall Description of the System

Figure 1:
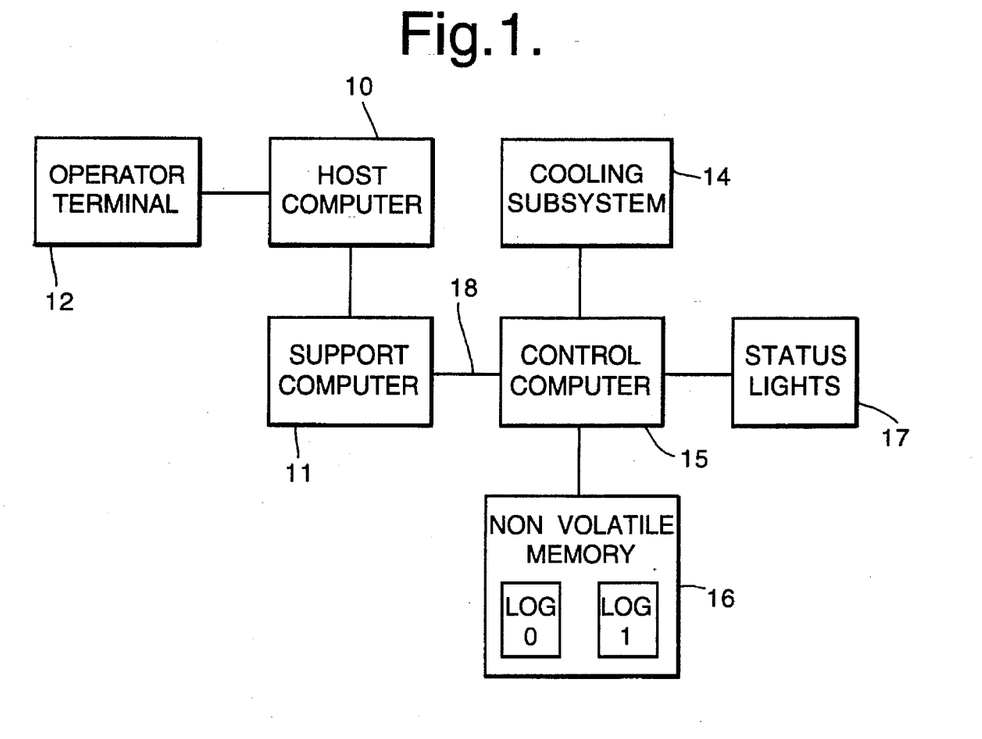
FIG. 1 is a block diagram of a data processing system comprising a host computer, a support computer, and a control computer.

Referring to FIG. 1, the system comprises a host computer 10 and a support computer 11. The host computer performs the main workload of the system, running user application programs. The support computer provides support services for the host computer, such as initial program load, monitoring and diagnosis of faults.

The host computer 10 has an operator terminal 12 including a visual display unit and keyboard, to allow it to receive input information from an operator and to display messages to the operator. The host computer 10 also has a cooling sub-system 14, including fans for air cooling.

A dedicated control computer 15 controls and maintains the operation of the cooling sub-system. For example, the control computer 15 can monitor parameters such as temperature at various points in the system, ambient temperature, and fan speed, and can control system functions such as fan speed.

The control computer has a non-volatile memory 16 associated with it. This may comprise, for example, a RAM memory with a lithium battery back-up to maintain the contents of the memory in the event of interruption of the power supply to the memory. The non-volatile memory holds two status logs, referred to as log 0 and log 1.

The control computer 15 has a set of status lights 17 which provide a visual indication of the operational state of the cooling system.

The control computer 15 is connected by way of a link 18 to the support computer 11, which allows the support computer to send commands to and to receive information from the control computer.

As will be described in more detail later, the information transmitted from the control computer includes both data values, representing the contents of the logs, and control values, such as end of message (EOM) bytes. In order to distinguish the data values from the control values, all data bytes are tagged as follows.

Each byte of data is split into two nibbles (four bit values). Each nibble has a distinctive four-bit value appended to its most significant end. Thus each byte of data will be transformed into two bytes of data, each of which has an identical and distinctive value in the most significant four bits. The data is formatted and annotated by software at the receiving end. The tagging is ignored by this software, but is retained in the original file, i.e. it is not deleted on receipt.

Status Log

Figure 2:
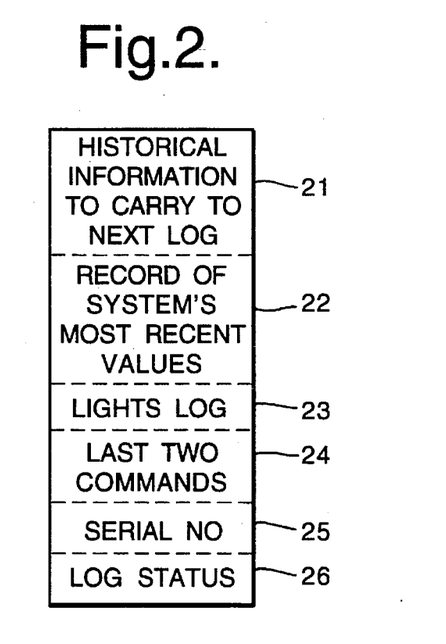
FIG. 2 is a schematic diagram showing the contents of one of two logs maintained by the control computer.

Referring now to FIG. 2, this shows one of the status logs in more detail.

A first area 21 of the log holds status information of a historical nature which spans a number of power-on life cycles and is passed forward from log to log. This is updated when it becomes necessary to shut down the system for any reason.

A second area 22 of the log holds all the monitored status values of the system. In an active log this is being constantly updated. By definition, a record of any exception conditions detected by the control computer, such as an indication that temperature has risen above a predetermined threshold value, or that fan speed has dropped below a threshold value is manifested here.

A third area 23 of the log holds a record of the latest information displayed on the lights 17. A fourth area 24 of the log stores the last two commands received from the support computer.

Each log has a log serial number 25, which is allocated to it when the log is first opened for use, to facilitate subsequent analysis of the log. Essentially, this helps to verify contiguity of the logs, i.e. to verify that there are no logs missing out of a given sequence of logs.

Each log also has status flags 26 which define the following statuses for the log:

in use unused and available in use with system fault(s) recorded locked

When the control computer is powered up for the first time, it creates two empty logs, marking one as unlocked, in use and unused, and the other as available.

Log Consistency Checking

Whenever the control computer 15 is powered up, the following checks are performed.

First, a test is performed to determine whether the lithium back-up battery for the non-volatile store 16 has failed during power off. If so, both logs are marked as unreliable due to battery failure.

The logs are then checked to determine whether statuses are logically consistent. As a pair, the logs should be in one of the following states:

one log unlocked and in use and the other available (ie unlocked, not in use and unused).

one log unlocked and in use and the other log locked.

Figure 3:
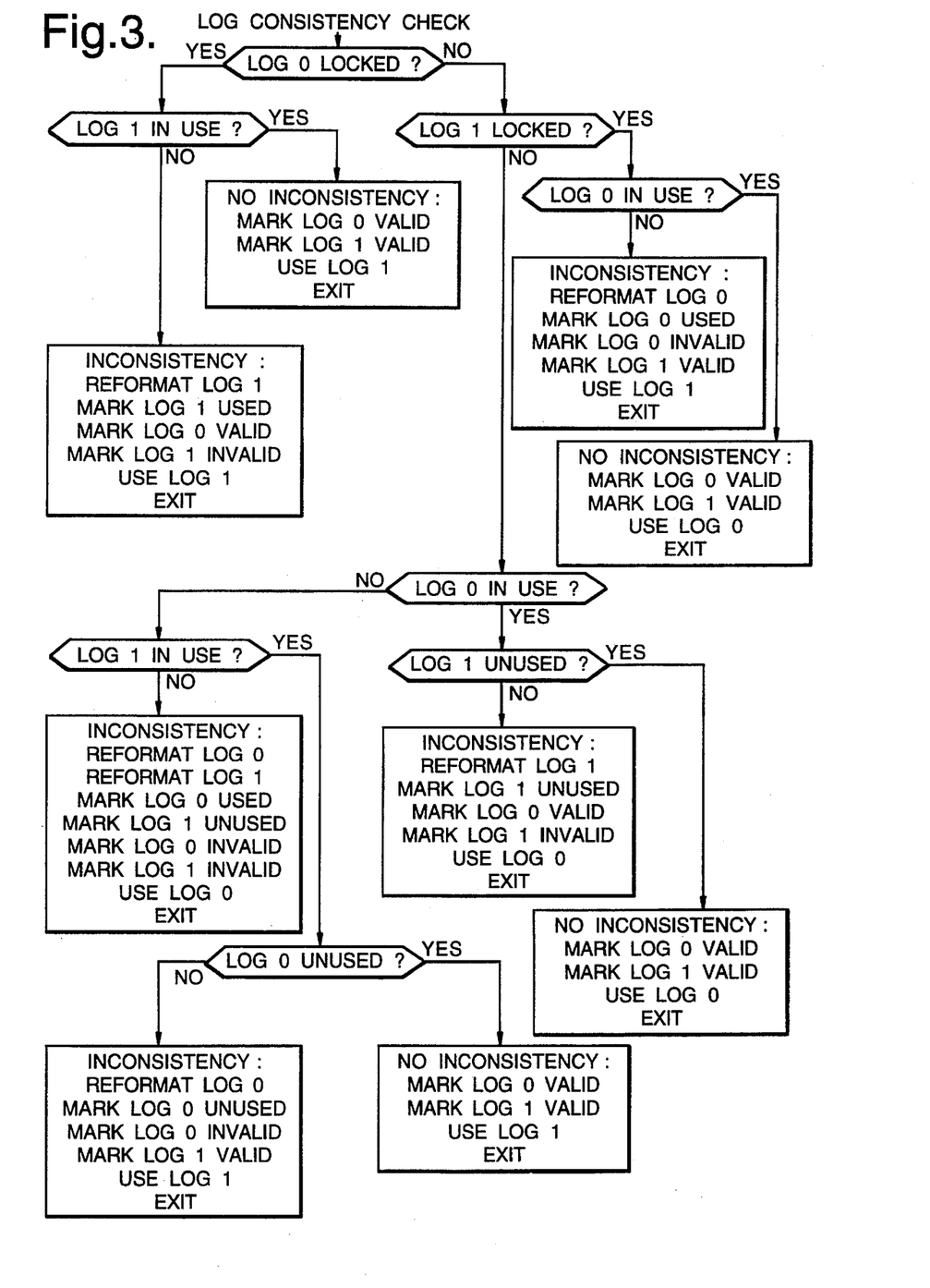
FIG. 3 is a flow chart showing a process for checking the logs for consistency.

Referring to FIG. 3, this shows the operation of the control processor for checking the logs for consistency. It can be seen that, in general, the log that was in use at the last power-down is selected to continue in use at power-up. If, however, the statuses of the two logs are inconsistent (for example because mains power failed while one of the logs was being updated) then one or both of the logs is re-formatted, and the statuses of the two logs are adjusted to mutually consistent values.

Control Computer Operation

Figure 4:
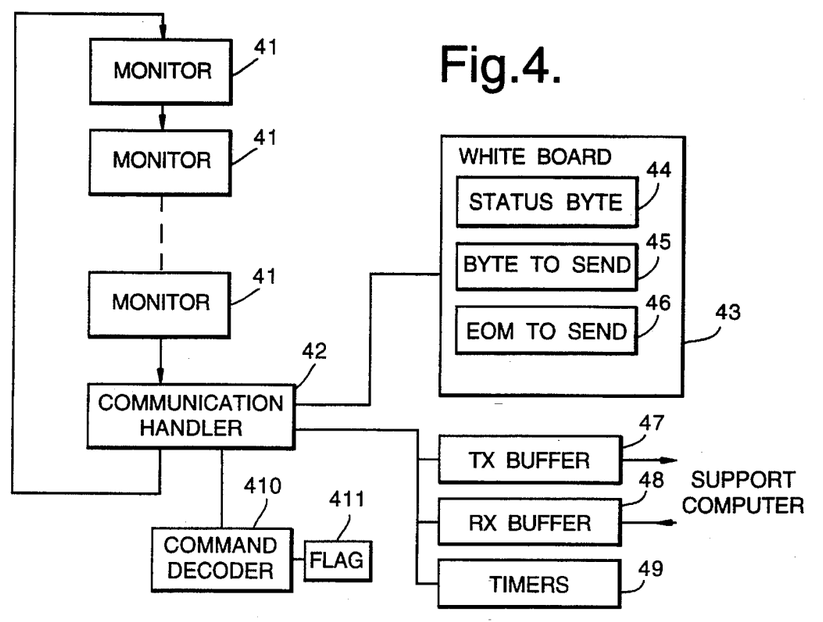
FIG. 4 is a diagram showing the operation of the control computer.

Referring now to FIG. 4, the control computer 15 runs a monitoring process comprising a number of monitoring functions 41, each of which monitors a particular system parameter. For example, one of the functions monitors ambient temperature, others monitor temperatures at different points in the system, and so on. These monitoring functions are executed cyclically, in a closed loop.

The loop also includes a number of calls to a communications handler process 42. In the drawing, only one such call is shown, but in general there may be several such calls, spaced around the loop, so as to ensure that this process is performed at sufficiently regular intervals.

The communications handler process 42 makes use of a reserved area of memory, referred to as the whiteboard 43, which holds information defining the tasks that the communications handler currently has to perform.

The whiteboard includes a status byte 44, the bits of which have the following meanings:

bit 0: attention to transmit bit 1: awaiting ACK bit 2: awaiting check command bit 3: awaiting reset bit 4: not used bit 5: not used bit 6: command in progress bit 7: status transmission in progress The whiteboard also includes a byte-to-send buffer 45, which holds the value of a data byte awaiting transmission, and an EOM-to-send buffer 46, which holds an EOM byte awaiting transmission.

The communications handler 42 passes messages to the support computer by way of a transmit (TX) buffer 47, and receives messages from the support computer by way of a receive (RX) buffer 48. The RX buffer has error detection circuitry associated with it, and sets an error flag when it detects a communications error.

The communications handler 42 has access to a set of timers 49, including a 1 second timer which is used, as will be described, to time-out acknowledgement signals.

Commands received from the support computer by the communications handler 42 are passed to a command decoder 410 for processing. The command decoder has a flag 411 associated with it, referred to as the limited command set flag. As will be explained, when this flag is set, only a subset of commands are permitted.

Monitoring Process

Figure 5:
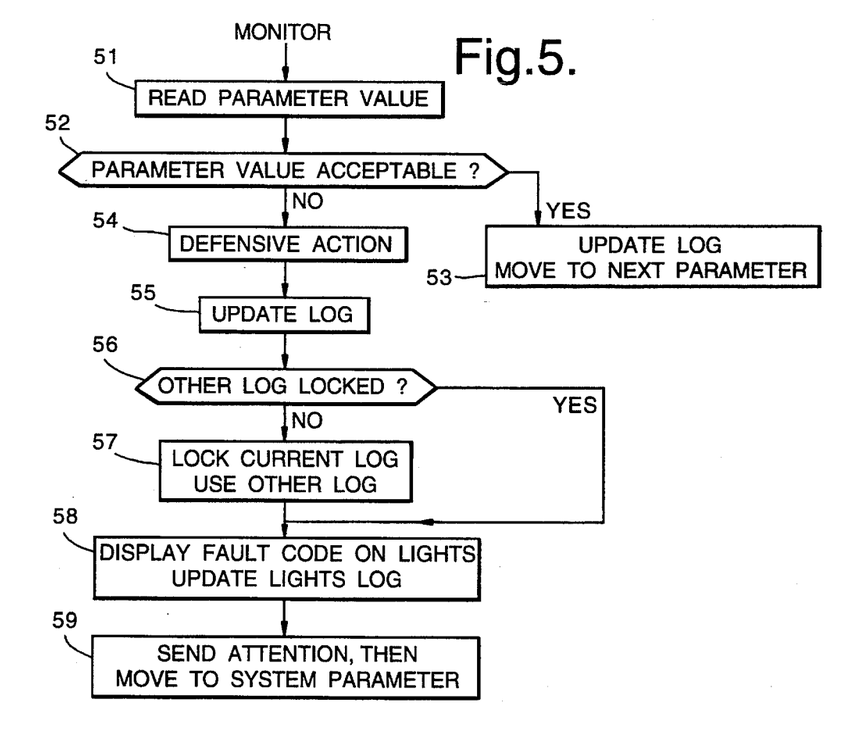
FIGS. 5–7 are flow charts showing the operation of the control computer.

FIG. 5 shows the operation of the monitoring process.

(51) The monitoring process reads the current value of a particular system parameter.

(52) The parameter value is tested to determine, as appropriate, whether it is logically correct or within numerically acceptable limits.

(53) If the parameter value is determined to be acceptable, the monitoring process records the value in the area 22 of the log currently in use, and moves on to address the next system parameter in the monitoring sequence.

(54) If the parameter value is determined not to be acceptable, it is an indication of a condition which could result in the failure or loss of resilience of the system. Appropriate defensive action is initiated to contain the incident, and to maintain the integrity of the subsystem.

(55) The parameter value is written into area 22 of the log currently in use. Additional information may be also be written into the area 21 of that log.

(56) The status flags 26 of the other log (i.e. the log not currently in use) are then checked to see whether that log is locked.

(57) If the other log is not locked, the log that has just been written to is then locked and the other log is set to "in use".

(58) A value indicating the nature of the problem is written to the lights display 17 and the lights log 23 is updated.

(59) Finally, the "attention to transmit" bit in the whiteboard status byte is set. This initiates the sending of an Attention byte to the support computer, to inform it that an incident has occurred. As will be described, when an Attention byte is sent, the "awaiting ACK" bit is set, and the 1 second timer is started. The support computer is then expected to send an ACK byte to the control computer to acknowledge receipt of the Attention. If no ACK is received from the support computer before the 1 second time-out expires, the Attention byte is repeated.

Request Locked Log

Figure 6:
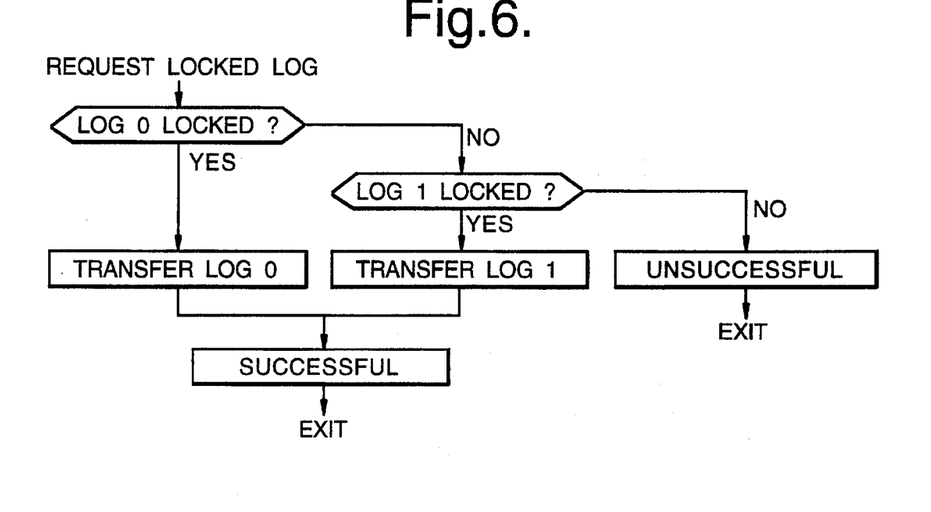

When the support computer has acknowledged an Attention byte, it sends a REQUEST LOCKED LOG command to the control computer, requesting it to supply a copy of the currently locked log. FIG. 6 shows the action of the control computer when it receives a REQUEST LOCKED LOG command.

The control computer checks whether one of the logs is locked. If neither log is locked, the control computer places an "unsuccessful" EOM code in the EOM-to-send buffer 46 of the whiteboard, for sending to the support computer to inform it that this command cannot be successfully executed.

If one of the logs is locked, the procedure initiates transfer of the data in that log to the support computer, by setting the "status transmission in progress" bit in the whiteboard status byte 44. The procedure also sets pointers to the start of the locked log, and sets the length of transfer to the length of the locked log.

When all the data in the locked log has been sent, the control computer sends a "successful" EOM code to the support computer, to indicate successful completion of this command.

When the system is started up, there will usually be one or more incidents already recorded in one of the control computer's logs, relating to transient conditions at the time that mains power was last removed from the system. To cover this situation, it is arranged that, whenever the support computer is powered up, it automatically issues a REQUEST LOCKED LOG command, without waiting for an Attention byte from the control computer. The support processor also requests locked logs after it has had a reload. This is because it is possible that the reload command occurred just as the support processor acknowledged an attention.

Following the reload, the support processor would have no record of such an acknowledgement, but the control processor would regard the transaction as being complete. Information would not be lost, but the support processor would not extract the relevant log until a subsequent failure warranted another Attention being sent, or the system is powered off and on.

Request Log

The support computer may also issue a REQUEST LOG command to request the control computer to return the contents of the log currently in use. While the data in this log is being transmitted to the support computer, further updates of the data will occur. Therefore, the data transmitted is actually a composite of a set of constantly changing values, rather than a frozen instance of the log. This does not present any problems, however, since an unlocked and in use log contains, by definition, a range of valid and mutually compatible system parameters.

Unlock

Figure 7:
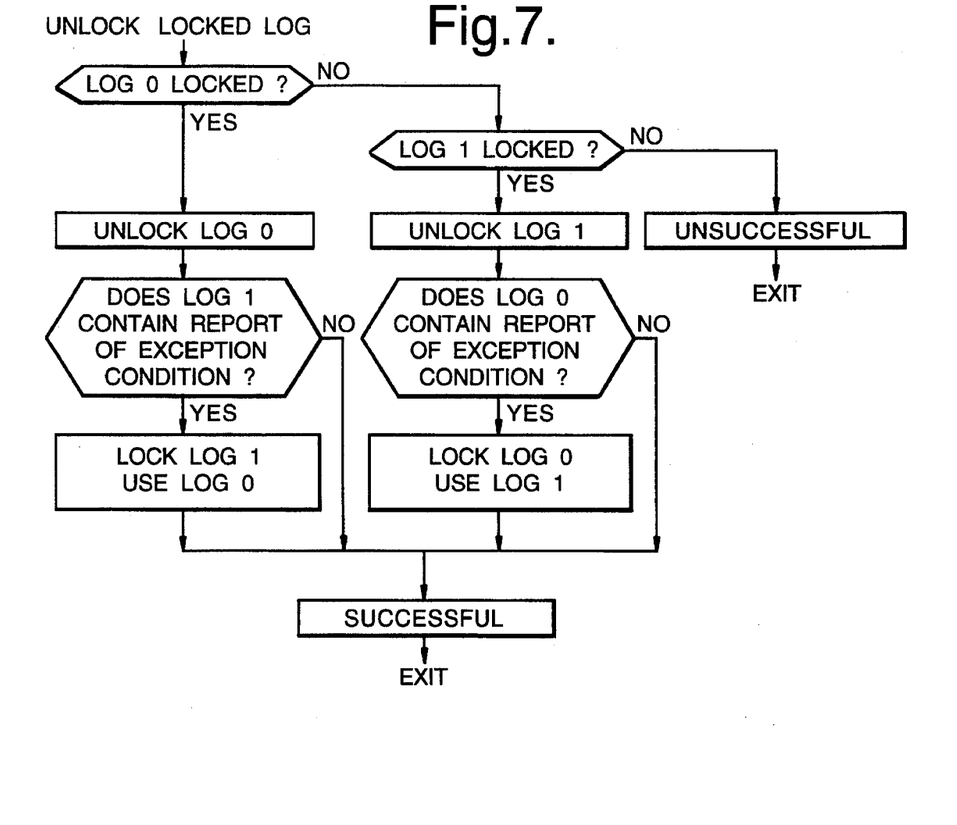

When the support computer receives the data from the locked log, it forwards it to the host 10. When the support computer has confirmation that the log is secure with the host, it then sends an UNLOCK command to the control computer, instructing it to unlock the locked log. FIG. 7 shows the operation of the control computer when it receives an UNLOCK command.

The control computer checks whether one of the logs is locked. If neither log is locked, it then places an "unsuccessful" EOM code into the EOM-to-send buffer 56, for transmission to the support computer, to inform it that the UNLOCK command cannot be executed.

If one of the logs is locked, the status of that log is changed to unlocked and not in use. The control computer then checks whether the other log contains any reports of exception conditions. If so, it is now locked, and the log that has just been unlocked is set to the in use state. A "successful" EOM code is then written into the EOM-to-send buffer 46, for transmission to the support computer to inform it of the successful completion of the UNLOCK command.

After unlocking the log, the support computer issues another REQUEST LOCKED LOG command, to obtain data relating to any further incidents that have been logged since the last REQUEST LOCKED LOG command. This is then repeated until an "unsuccessful" EOM code is returned, indicating that all the fault information has been extracted.

Limited Command Mode

When the limited command flag 411 is unset, all the above commands are allowed. However, when the flag is set, only a predetermined subset of the commands is permitted. Specifically, when the flag is set, the REQUEST LOG and REQUEST LOCKED LOG commands are permitted, but the UNLOCK command is not allowed.

The flag 411 is set whenever the control computer detects that it cannot maintain a functional service, i.e. cannot continue to monitor and control the cooling subsystem adequately. This ensures that, in these conditions, the locked log cannot be unlocked and hence guarantees preservation of the fault information in the locked log until the control computer is restored to normal operation.

Communications Handler

Figure 8:
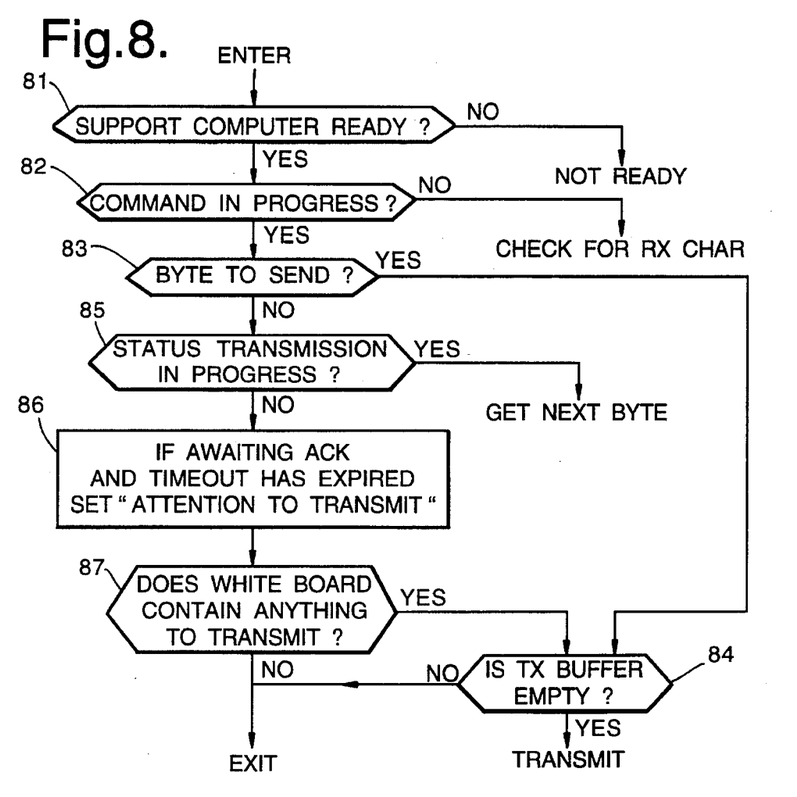
FIGS. 8–10 are flow charts showing the operation of a communications handler process in the control computer.

Referring to FIG. 8, this shows the main loop of the communications handler.

(81) The communications handler first checks whether the support computer 11 is ready to receive data from the control computer 15. If so, it goes to step 82; otherwise, it calls a NOT READY subroutine (see below).

(82) The communications handler checks whether the whiteboard "command in progress" bit is set. If so, it goes to step 83; otherwise, it calls a CHECK FOR RX CHAR subroutine (see below).

(83) The communications handler checks whether the byte-to-send buffer 45 contains any data. If so, it goes to step 84; otherwise it goes to step 85.

(84) The communications handler checks whether the TX buffer 47 is empty. If so, it calls a TRANSMIT subroutine (FIG. 9), to load a byte into this buffer. Otherwise, the communications handler exits.

(85) The communications handler checks whether the whiteboard "status transmission progress" bit is set. If so, it calls a GET NEXT BYTE subroutine (see below). Otherwise, it goes to step 86.

(86) If the "awaiting ACK" bit is set, and the 1 second timer has expired, this means that an Attention byte has not been acknowledged within the required timeout period. The communications handler therefore sets the "attention to transmit" bit, so as to initiate the sending of another Attention byte.

(87) The communications handler checks whether the whiteboard contains anything to transmit. If so, the communications handler goes to step 84 described above. Otherwise, the communications handler exits.

Not Ready

The action of the NOT READY subroutine is as follows.

The subroutine first clears all the whiteboard, except for the "attention to transmit" and "awaiting ACK" bits.

The subroutine then checks the "attention to transmit" and "awaiting ACK" bits. If either is set, the subroutine sets the "command in progress" and "attention to transmit" bits, and clears the "awaiting ACK" bit.

Finally, the subroutine resets the RX buffer 48 and clears its communications error flag. The communications handler then exits.

Check for RX Char

The action of the CHECK FOR RX CHAR subroutine is as follows.

The subroutine first checks whether a received character is available in the RX buffer 48. If so, a RECEIVE subroutine is performed (see below).

If no character is available, the subroutine checks whether the "awaiting ACK" bit is set, and the 1 second timer has expired. If so, the whiteboard "attention to transmit" and "command in progress" bits are set. The communications handler then exits.

Receive

The action of the RECEIVE subroutine is as follows.

Figure 10:
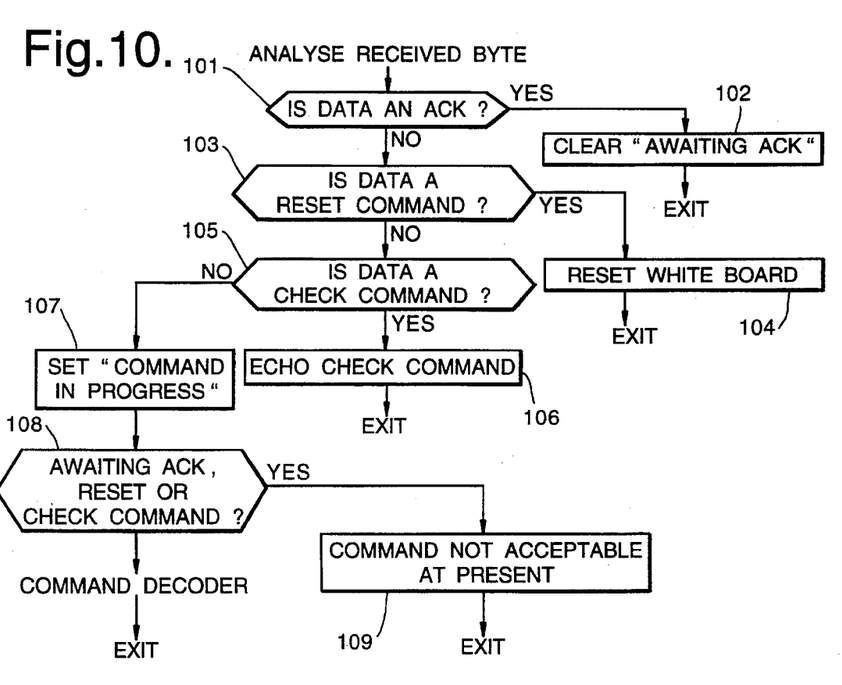

The subroutine first checks whether the communications error flag associated with the RX buffer 48 has been set, indicating a detected error. If no errors have been detected, the subroutine reads the data from the RX buffer and then calls an ANALYZE RECEIVED BYTE subroutine (FIG. 10).

If errors have been detected, the subroutine reads and discards the data from the RX buffer, writes an EOM code into the EOM-to-send buffer 46 indicating that the received data had a parity error, and sets the "command in progress" bit. The communications handler then exits.

Get Next Byte

The action of the GET NEXT BYTE subroutine is as follows.

The subroutine first gets the next status nibble to be sent, tags it, and puts into the byte-to-send buffer 45.

The subroutine then checks whether this is the last byte to be sent. If so, the subroutine writes a "successful" EOM code into the EOM-to-send buffer 46, and unsets the "status transmission in progress" bit. The communications handler then exits.

Transmit

Figure 9:
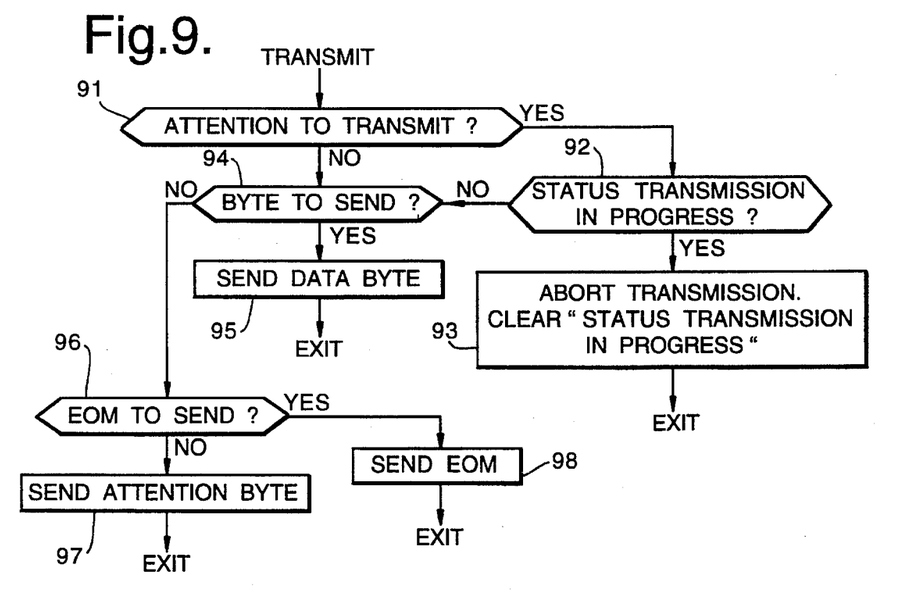

Referring now to FIG. 9, this shows the action of the TRANSMIT subroutine.

(91) The subroutine first checks whether the "attention to transmit" bit is set. If so, the subroutine goes to step 92; if not it goes to step 94.

(92) The subroutine checks whether the "status transmission in progress" bit is set. If so, the subroutine goes to step 93; if not it goes to step 94.

(93) The transmission of any status data is aborted, by setting the byte-to-send and EOM-to-send buffers 45, 46 to zero, unsetting the "status transmission in progress" bit, and writing an "aborted" EOM code into the TX buffer 47. The communications handler then exits.

(94) The subroutine checks whether the byte-to-send buffer 45 contains data. If so, the subroutine goes to step 95; otherwise, it goes to step 96.

(95) The subroutine sends a data byte to the support computer, by writing the contents of the byte-to-send buffer into the TX buffer 47, and resetting the byte-to-send buffer to zero. The communications handler then exits.

(96) The subroutine checks whether the EOM-to-send buffer 46 contains an EOM code. If so, the subroutine goes to step 98; otherwise, it goes to step 97.

(97) The subroutine sends an Attention byte to the support computer, by writing an "attention" code into the TX buffer 47, unsetting the whiteboard "command in progress" and "attention to transmit" bits, setting the "awaiting ACK" bit, and starting the 1 second timer. The communications handler then exits.

(98) The subroutine sends an EOM to the support computer, by writing the contents of the EOM-to-send buffer 46 into the TX buffer 47, and resetting the EOM-to-send buffer to zero. Also, if the "attention to transmit" bit is not set, the subroutine unsets the "command in progress" bit. The communications handler then exits.

Analyze Received Byte

Referring now to FIG. 10, this shows the action of the ANALYZE RECEIVED BYTE subroutine.

(101) The subroutine first checks whether the received data byte is an ACK. If so, the subroutine goes to step 102; otherwise it goes to step 103.

(102) The "awaiting ACK" bit is cleared, and the communications handler then exits.

(103) The subroutine checks whether the received data byte was a reset command. If so, the subroutine goes to step 104; otherwise it goes to step 105.

(104) The subroutine resets the whiteboard by clearing all the status byte 44 except for the "attention to transmit" and "awaiting ACK" bits, and clearing the byte-to-send buffer 45. The subroutine then sets the "awaiting check command" and "command in progress" bits, and puts a "reset received" EOM code into the EOM-to-send buffer 46. The communications handler then exits.

(105) The subroutine checks whether the received data byte was a check command. If so, the subroutine goes to step 106; otherwise it goes to step 107.

(106) The subroutine clears the "awaiting check command" bit. The subroutine then echos the check command back to the support processor, by writing the check command into the byte-to-send buffer 45, writing a "successful" EOM code into the EOM-to-send buffer 46, and setting the "command in progress" bit. The communications handler then exits.

(107) The subroutine sets the "command in progress" bit.

(108) The subroutine then checks whether any of the "awaiting ACK", "awaiting reset", or "awaiting check command" bits is set. If any of these bits is set, the subroutine goes to step 109. Otherwise, the subroutine calls a command decoder process (FIG. 11), and the communications handler then exits.

(109) The subroutine puts an EOM code into the EOM-to-send buffer 46, indicating that the command is not contextually acceptable at the present time. The communications handler then exits.

Command Decoder

Figure 11:
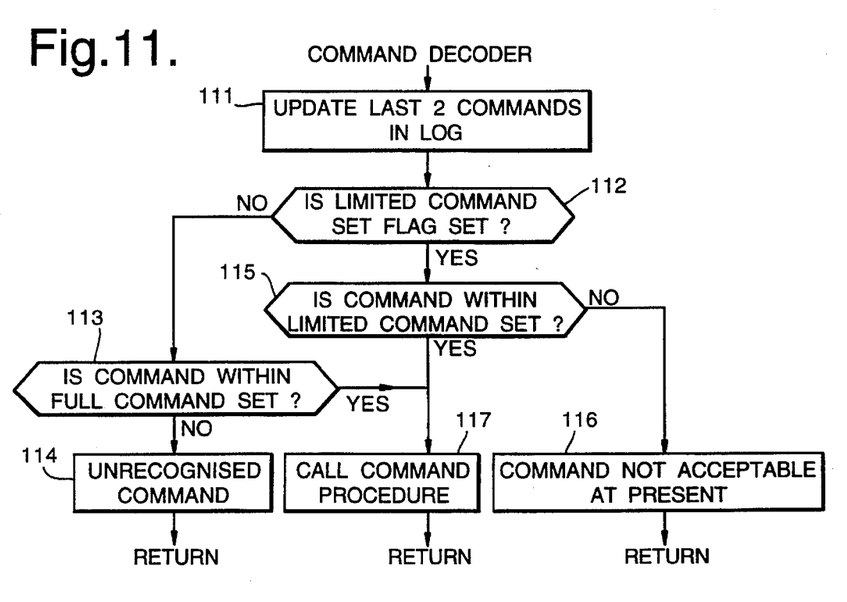
FIG. 11 is a flow chart showing the operation of a command decoder process in the control computer.

FIG. 11 shows the command decoder process 510 in detail.

(111) The first action of the command decoder is to copy the command into the area 24 of the "in use" log, so as to keep it up-to-date with the latest two commands received.

(112) The decoder then checks whether the limited command set flag 411 is set. If so, the decoder goes to step 115; otherwise it goes to step 113.

(113) The command decoder checks whether the command is within the full command set of the control computer. If it is, the decoder goes to step 117; otherwise it goes to step 114.

(114) An EOM code is placed in the EOM-to-send buffer, this code indicating that the data received is unrecognised and is assumed to be an illegal command.

(115) If the limited command set flag is set, the command decoder checks whether the command is within the limited command set. If so, the decoder goes to step 117; otherwise it goes to step 116.

(116) An EOM code, indicating that the command is not contextually acceptable at the present time is placed in the EOM-to-send buffer.

(117) If the command is within the limited command set, the command is executed by calling the appropriate command procedure.

Conclusion

It will be appreciated that the mechanisms described above for writing, requesting, and unlocking the logs provide a convenient way of ensuring that the information in the logs is maintained, until it has been secured by the host system.

It will also be appreciated that many modifications may be made to the system described above without departing from the scope of the present invention.

For example, although in the system described above only two logs are used, in other embodiments of the invention more logs may be used.

I claim:

1. A data processing system comprising first and second processing units, wherein the first processing unit includes:
    (a) monitoring means for monitoring physical parameter values within said data processing system;
    (b) a non-volatile memory holding a plurality of status logs,
    (c) means for designating one of said logs as the current log,
    (d) means for designating each of said logs as locked or unlocked,
    (e) means for writing said physical parameter values into the current log and then, if at least one other log is unlocked, locking the current log and designating said other log as the current log,
    (f) means for transmitting the contents of the locked log to the second processing unit in response to a data request from the second processing unit, and
    (g) means for unlocking the locked log in response to an unlocking request from the second processing unit.

2. A system according to claim 1 wherein, when a locked log is unlocked, if another log currently contains fault information, that other log is then locked.

3. A system according to claim 1 wherein a subsystem comprises a cooling system, and said operational parameters include temperature, and fan speed.

4. A system according to claim 1 wherein said first processing unit includes status lights and wherein the status data in said logs includes an indication of the settings of said status lights.

5. A system according to claim 1 wherein the first processing unit includes means for preventing unlocking of the locked log when the first processing unit is not fully operational.

6. A system according to claim 1 wherein each log is allocated a sequence number when that log is opened.

7. A data processing system comprising first and second processing units, wherein the first processing unit includes:
    (a) monitoring means for monitoring physical parameter values within said data processing system;
    (b) a non-volatile memory holding two status logs,
    (c) means for designating one of said logs as the current log,
    (d) means for designating each of said logs as locked or unlocked,
    (e) means for writing said physical parameter values into the current log and then, if the other log is unlocked, locking the current log and designating said other log as the current log,
    (f) means for transmitting the contents of the locked log to the second processing unit in response to a data request from the second processing unit, and
    (g) means for unlocking the locked log in response to an unlocking request from the second processing unit.

\* \* \* \* \*